Oct. 6, 1959     E. A. WHITE     2,907,327
PELLET IMPLANTER
Filed Feb. 8, 1957
Fig. 1.
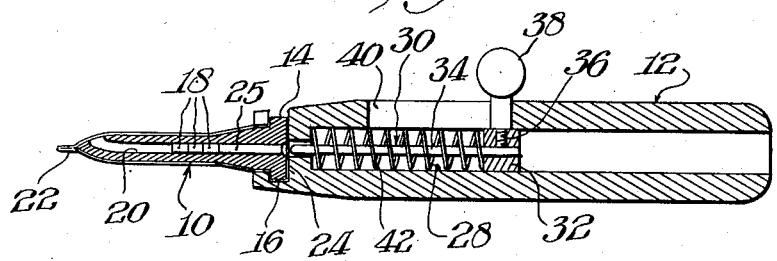
Fig. 3.        Fig. 2.        Fig. 4.
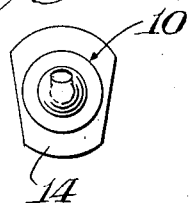 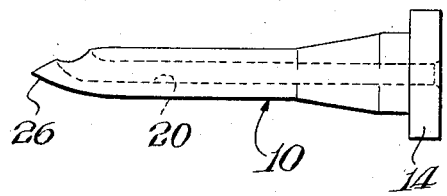 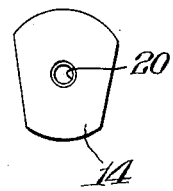
Fig. 6.        Fig. 5.        Fig. 7.
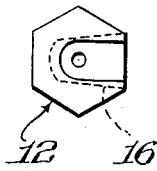 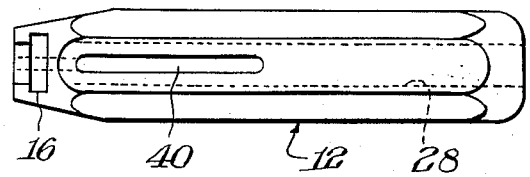 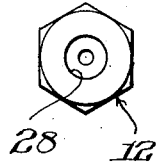
INVENTOR
Edward A. White
BY Connolly and Hutz
ATTORNEYS : 2,907,327
Patented Oct. 6, 1959

2,907,327
PELLET IMPLANTER

Edward A. White, Allendale, Ind., assignor to Chas. Pfizer & Co., Inc., New York, N.Y., a corporation of Delaware Application February 8, 1957, Serial No. 639,039

9 Claims. (Cl. 128—217)

This invention relates to a device for subcutaneous implantation, and more particularly to a device for implanting medicinal pellets in animals.

The practice of implanting hormone pellets in cattle to promote increased growth has become quite prevalent. If the same implanting device is used successively upon a number of animals, there is a good possibility of transmitting diseases from one to the other. Heretofore, it has been recommended that a pair of implanting devices be alternately used so that they can be immersed in a germicide between implantations. This practice is troublesome and there is no assurance that the immersion period is sufficient to kill all disease carriers.

An object of this invention is to provide a simple economical implanting device which is simple to operate and which prevents transmission of disease from one animal to the other.

In accordance with this invention, an implanting device includes a combination cartridge and needle member and a body. A charge of medicinal pellets is packaged within this combination needle and cartridge member and retained therein by means of obstructing means which can either be removed, bypassed or broken by the inserting plunger. A detachable coupling means is incorporated within one end of the combination needle and cartridge member and holder to permit convenient attachment and detachment in the field. The inserting end of the combination needle and cartridge member can be covered with a removable sheath which helps retain the pellets and prevents contamination before insertion. The coupling end can be conveniently sealed by means of a sheet which can easily be perforated by the plunger. This combination needle and cartridge member is made of an inexpensive material, plastic for example, so that it can be economically discarded after a single use.

Novel features and advantages of the present invention will become apparent to one skilled in the art from a reading of the following description in conjunction with the accompanying drawings wherein similar reference characters refer to similar parts and in which:

Fig. 1 is a cross-sectional view in elevation of an embodiment of this invention;

Fig. 2 is a view in elevation of a portion of the embodiment shown in Fig. 1;

Fig. 3 is an end view of the embodiment shown in Fig. 2;

Fig. 4 is another end view of the embodiment shown in Fig. 2;

Fig. 5 is a plan view of a portion of the embodiment shown in Fig. 1;

Fig. 6 is an end view of the embodiment shown in Fig. 5; and

Fig. 7 is another end view of the embodiment shown in Fig. 5.

In Fig. 1 is shown an assembled implanting device prior to insertion. A combination needle and cartridge member 10 is coupled to a holder 12 by insertion of needle coupling flange 14 within slot 16 at the front end of the body. A charge of medicinal pellets 18, three hormone pellets for example, is disposed within passageway 20 extending through the needle member 10. The pellets are retained within the combination needle and cartridge member 10 prior to insertion by means of a removable cover 22 and a perforable sheet 24 which seals the coupling end of the member 10. A spacer rod 25 of plastic, for example, is disposed within passageway 20 in back of the pellets to insure that they are all ejected, but this rod is not required if a plunger of sufficient length is used.

Cover 22 may be made of plastic tubing, for example, which substantially covers the inserting portion of the needle to prevent it from contamination before use. Sealing sheet 24 is made of cellophane, for example, or any easily broken synthetic sheet.

In Fig. 1, in conjunction with Figs. 2–4, details of the combination cartridge and needle structure are shown. The needle member 10 may be conveniently fabricated of plastic, a phenolic resin for example. The front end of passageway 20 is laterally diverted, for example, to help retain the pellets prior to insertion when the cover is removed, and to provide a sharp point 26 of substantial thickness to facilitate insertion. Flange 14 is substantially V-shaped to facilitate attachment and detachment respectively within and from V-shaped slot 16 at the front end of body 12.

In Fig. 1, in conjunction with Figs. 5–7, details of body 12 are shown. Body 12 includes a chamber 28 within which plunger assembly 30 slides back and forth. Body 12 may be conveniently fabricated of aluminum or a plastic such as phenolic resin for example. Plunger assembly 30 includes a plunger block 32 within which plunger rod 34 is inserted. Plunger rod 34 is retained within block 32 by the pressure of the threaded end 36 of a trigger element 38 which is mounted upon block 32 substantially perpendicular to rod 34. Trigger 38 slides back and forth within a slot 40 extending through the side of body 12 and communicating with chamber 28. A coil spring 42 of stainless steel or phosphor bronze for example, is mounted about rod 34. It bears against block 32 and the opposite end of chamber 28 to automatically retract the plunger after an inserting operation. This spring can be eliminated if desired.

Plunger block 32 may be conveniently made of brass or plated steel for example. Trigger 38 may be made of similar materials, and rod 34 may be made of either stainless steel or plated steel.

Operation

A combination cartridge and needle assembly 12 may be used for inserting its contained pellets into only one animal and then discarded. Cover 22 may be used to insure that no contamination of any sort occurs prior to use, but might be dispensed with in the interest of economy. Flexible obstructing means might be incorporated into both ends of the passageway in the needle to retain the pellets before insertion and to permit passage of the plunger to insert the pellets. A single holder may, therefore, be used with a succession of cartridge and needle assemblies without fear of transmitting disease from one animal to the next because the only part of the unit which touches the animal is discarded after a single use. Since the combination cartridge and needle member is made of a relatively inexpensive material such as plastic, it may economically be discarded after each use, particularly in view of the fact that need for a separate pellet containing cartridge is thereby eliminated.

What is claimed is:

1. A pellet implanting device comprising a body, a plunger mounted within said body, a needle member having a passageway extending therethrough, readily detachable coupling means incorporated with said needle member and said body, said coupling means removably attaching said needle member to said body with said passageway substantially aligned with said plunger, a charge of pellets disposed within said passageway of said needle member, and a readily dislodgeable member attached to said needle member on both sides of said charge of pellets for retaining said charge within said needle member prior to ejection by said plunger.

2. A pellet implanting device as set forth in claim 1 wherein said readily dislodgeable means includes an obstructing means disposed near the end of said passageway adjacent said coupling means, and said obstructing means is constructed and arranged to permit said plunger to readily pass through said passageway.

3. A pellet implanting device as set forth in claim 1 wherein said readily dislodgeable means includes a movable cover disposed over the inserting end of said needle member for retaining said pellets within said needle member and for maintaining said needle member uncontaminated prior to use.

4. A combination needle and cartridge for a pellet implanting device which includes a plunger mounted within a holder, said combination needle and cartridge comprising a tubular member having a pellet conducting passageway extending therethrough, one end of said member having a substantially sharp point to facilitate its insertion, the other end of said member including a readily detachable coupling device for attaching said member to said holder, a charge of pellets disposed within said member in position to be ejected by said plunger, and a readily dislodgeable means attached to said tubular member on both sides of said charge of pellets for retaining said charge within said tubular member prior to ejection by said plunger.

5. A combination needle and cartridge as set forth in claim 4 wherein said readily dislodgeable means includes a sheet of material sealing the coupling end of said member, and said sheet of material is constructed and arranged to be easily perforated by said plunger.

6. A combination needle and cartridge as set forth in claim 4 wherein said readily dislodgeable means includes a cover disposed over the sharp end of said member for preventing its contamination and for helping to retain said pellets prior to ejection.

7. A combination needle and cartridge as set forth in claim 4 wherein said passageway is laterally diverted adjacent said sharpened end to provide a sharp point of substantial thickness to facilitate insertion and to help retain said pellets prior to insertion.

8. A combination needle and cartridge as set forth in claim 4 wherein the coupling end of said member includes a V-shaped flange for facilitating insertion and attachment to said holder.

9. A combination needle and cartridge as set forth in claim 4 wherein a spacer rod is disposed in said passageway in back of said pellets.

References Cited in the file of this patent

UNITED STATES PATENTS

| | | |
|---|---|---|
| 2,634,726 | Hanson | Apr. 14, 1953 |
| 2,638,897 | Poitras | May 19, 1953 |
| 2,751,907 | Hickey | June 26, 1956 |
| 2,761,446 | Reed | Sept. 4, 1956 |